(12) United States Patent
Zavala-Avelar

(10) Patent No.: US 7,490,373 B1
(45) Date of Patent: Feb. 17, 2009

(54) SHOWER HAVING A WATER SAVING SYSTEM

(75) Inventor: Juan Pablo Zavala-Avelar, Naciones Unidas 6361-57, Parque de la Castellana, Zapopan, JA (MX) 45117

(73) Assignee: Juan Pablo Zavala-Avelar, Zapopan (MX)

( * ) Notice: Subject to any disclaimer, the term of this patent is extended or adjusted under 35 U.S.C. 154(b) by 0 days.

(21) Appl. No.: 12/047,098

(22) Filed: Mar. 12, 2008

(51) Int. Cl.
*A47K 3/22* (2006.01)
*A47K 3/34* (2006.01)
*A47K 3/36* (2006.01)

(52) U.S. Cl. .................. 4/616; 4/567; 4/570; 4/615; 239/310

(58) Field of Classification Search .............. 4/567, 4/570, 597, 598, 615–618; 239/310, 316–318
See application file for complete search history.

(56) References Cited

U.S. PATENT DOCUMENTS

| | | | |
|---|---|---|---|
| 3,594,825 A | | 7/1971 | Reid |
| 4,941,616 A | * | 7/1990 | Liebler ................. 239/310 |
| 5,012,536 A | * | 5/1991 | Rivera ................... 4/617 |
| 5,085,278 A | * | 2/1992 | Keltner ................ 239/317 |
| 5,341,529 A | | 8/1994 | Serrano |
| 5,459,890 A | * | 10/1995 | Jarocki .................... 4/598 |
| 5,590,719 A | * | 1/1997 | McLoughlin et al. ....... 239/310 |
| 6,978,496 B2 | * | 12/2005 | Adrian ..................... 4/598 |

* cited by examiner

*Primary Examiner*—Tuan N Nguyen
(74) *Attorney, Agent, or Firm*—Knobbe Martens Olson & Bear LLP

(57) ABSTRACT

A shower having a water saving system, which comprises a deviation device defining two trajectories of flow of the water coming from the conventional pipe, a tank for storing the water that exits when opening the handles controlling the discharge of water of the shower so that said deviation device deviates the "first" water towards said tank; and a venturi tube placed in fluid communication between said deviation device and the shower outlet, said venturi tube including a conduit extending inside said tank for connection with a hose to allow the water contained in said tank to re-enter into the conventional pipe to be discharged towards the shower outlet.

12 Claims, 7 Drawing Sheets

SHOWER HAVING A WATER SAVING SYSTEM

CROSS-REFERENCE TO RELATED APPLICATIONS

The present application claims the benefit under 35 U.S.C. 119(a)-(d) of Spanish Patent Application No. MX/a/2007/016598, filed on Dec. 19, 2007, the entire contents of which are incorporated herein by reference.

FIELD OF THE INVENTION

The invention relates to water saving devices of the type being used in the area of the shower. More specifically, the invention refers a shower incorporating a novel system for saving water thanks to which the cold water that just exits a conventional shower, when the handle controlling the flush of hot water is opened, instead of being wasted passing directly to the drainage system without having been utilized, derives towards a storage tank whereby sufficient time elapses to allow the hot water to leave and mix itself with cold water in order that the water exiting the shower be at a comfortable temperature for the user.

BACKGROUND OF THE INVENTION

Putting to the shower in its proper role, i.e., as a device of daily and massive use in almost all of homes of the world, its importance in the society will have to be recognized, not only based on the service said shower provides as a means useful for our hygiene and comfort but also as an element of ecological alarm due to its close relation with the consumption of water and the waste thereof as a result of bad habits generalized in the population. Thus, by means of the model of shower of the present invention it is sought to contribute everyday to the saving of this vital liquid in each home and, since at the present time the conventional showers do not have any water saving system, and therefore the consumption of water is subject to the customs and particular uses of each person.

The main problem to face is the water waste at the moment people bathe, said problem resulting from the popular habits of opening the handles that control the water discharge towards the shower zone and letting the water to flow because it does not exit at the desired temperature to bathe, this causing said liquid is wasted since it passes directly towards the drainage system without having been utilized. It is well known that "the first" water that exits the shower normally does not have the temperature we desire to bathe and for that reason people waste water letting it flow until it has the temperature desired.

In an attempt to solve the problem of water shortage and promote its rational use, several and different systems for saving water has been proposed, among which there are some specially designed to re-utilize the water previously used in the shower bath for the discharge of the toilet. An example of that system is described in the U.S. Pat. No. 3,594,825 to Reid, in which a system of water supply for a shower and washbasin incorporated to a vehicle is described, said system consisting of a tank or deposit underneath the area of the shower to collect the water used during the shower bath and to direct it towards said water tank of the toilet. Although this system fulfills with its intention to re-use the soapy water and contribute to the water saving, said system is substantially different to that of the present invention.

Another system for water saving, similar in concept to the one previously mentioned, is described in U.S. Pat. No. 5,341,529 to Serrano, in which a system to re-use the soapy water resulting from a shower bath, which is collected in the shower area and is sent to a complementary tank being placed above the ordinary water tank of the toilet, and in fluid communication with this latter to supply the soapy water for operating the flush of the toilet. This patented system comprises a pumping device to convey the soapy water collected in the shower area to said complementary tank. Nevertheless, although this system meets the purpose of saving water, it is technically different from the present invention.

As distinguished from the conventional showers and other water saving systems of the prior art, the shower assembly of the present invention contains innovative elements, which in combination materialize a novel and practical system of water saving.

SUMMARY OF THE INVENTION

A primary object of the present invention is to propose a novel water saving system incorporated to a conventional shower to avoid the waste of the water that normally is not utilized while waiting for the hot water.

It is another object of the present invention to promote a change of attitude in the user so that the rational use of water and saving of this vital liquid is achieved by installing in a conventional shower a system for saving water like the one described in the present patent application.

Another object of the invention is to propose a new shower having the capacity to store a determined amount of water that will be used in the course of the shower process, whereby the waste of cold water usually passing directly to the drainage system without being used upon opening the shower handles is avoided.

The previous objects of the invention are achieved by a shower equipped with a water saving system which, in a preferred embodiment, comprises: a) a tank for water storage, which is located along the flow trajectory of the water coming from a water heater; b) a deviation device for deviating the water flowing through a water pipe, said deviation device having a lever that works between two positions, a first position allowing the water to flow along the normal trajectory of a conventional pipe, by following a direction towards the shower outlet, and second position in which the water flow is directed transitorily towards the storage tank; c) means of detecting the water level inside the storage tank, which comprises a floating element and a warning device being activated by said floating element when the water contained in said tank has reached a predetermined level of height; and d) a venturi-type device being connected in fluid communication with the pipe that conveys the water towards the shower, between the deviation device and the shower; said venturi device has means for connection with a hose or tube placed within the tank and by means of which the water contained in the tank re-enters into the trajectory of flow of water of said device to be mixed with the water coming from the conventional pipe to a higher temperature, once the lever of the deviation device has moved to the position in which it allows that the water to follow the trajectory towards the shower outlet without entering into the storage tank.

BRIEF DESCRIPTION OF THE FIGURES OF THE INVENTION

DETAILED DESCRIPTION OF THE PREFERRED EMBODIMENT OF THE INVENTION

The technical field of the present invention corresponds to the saving of natural resources, particularly in the saving of an important amount of the water that is wasted when a person bathes. The conventional showers consist only of a tube that conveys water to a discharge outlet, said tube having the shape necessary to provide a certain discharge angle depending on the exit element used to distribute the flow uniformly. The mixture of cold water with hot water is made when opening the handles installed in the shower baths to regulate the discharge of hot and cold water.

Figure 1:
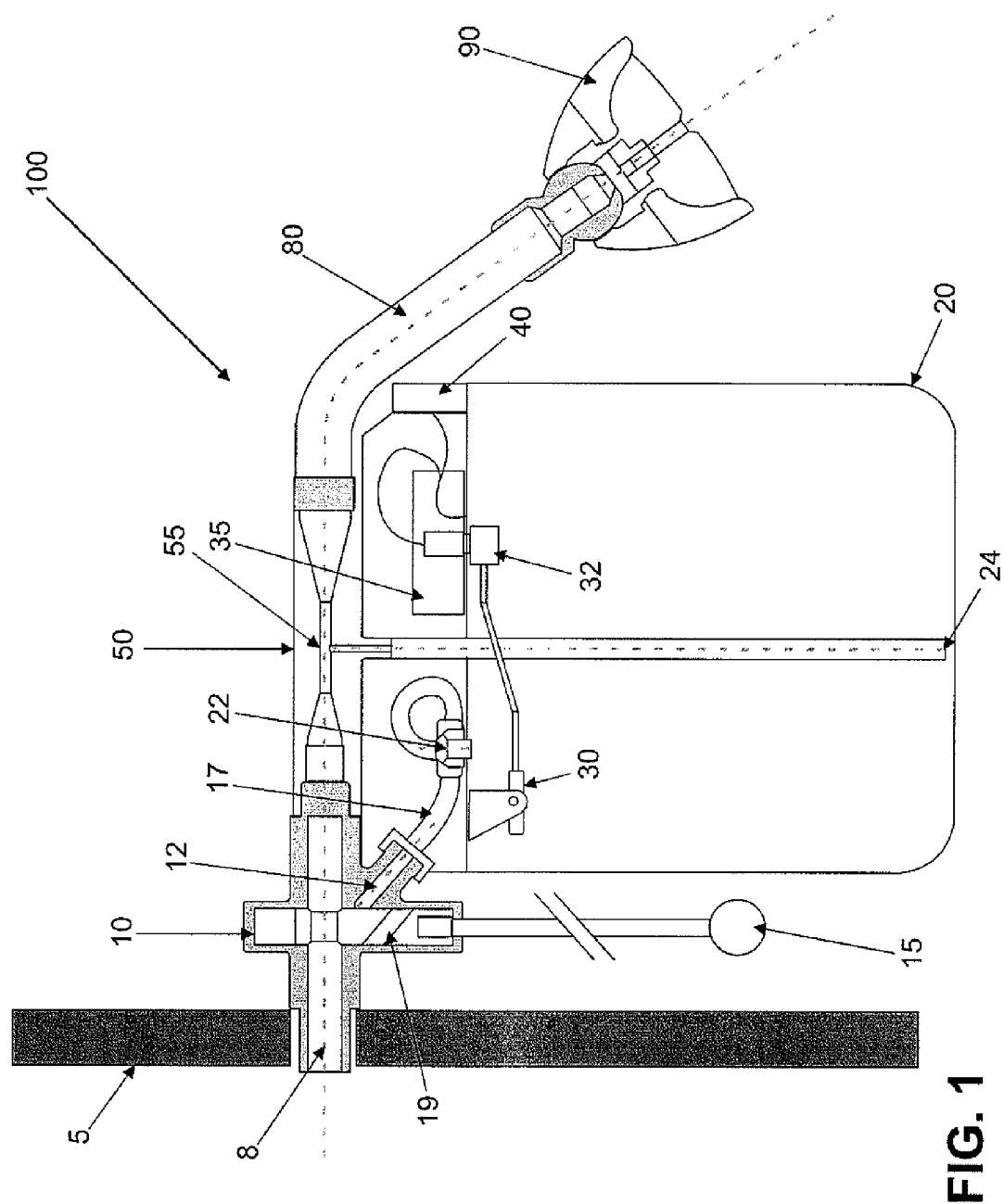
FIG. 1 is a cross-sectional view of the shower having a water saving system, in which the main elements thereof can be observed.
Figure 2:
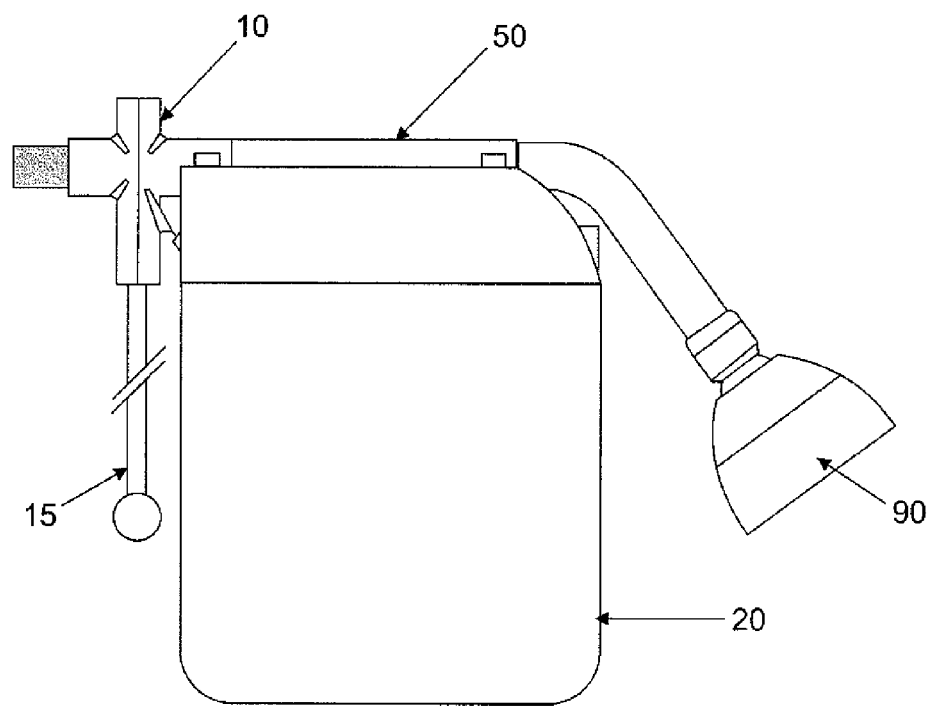
FIG. 2 is a side view of the shower having said water saving system.
Figure 3:
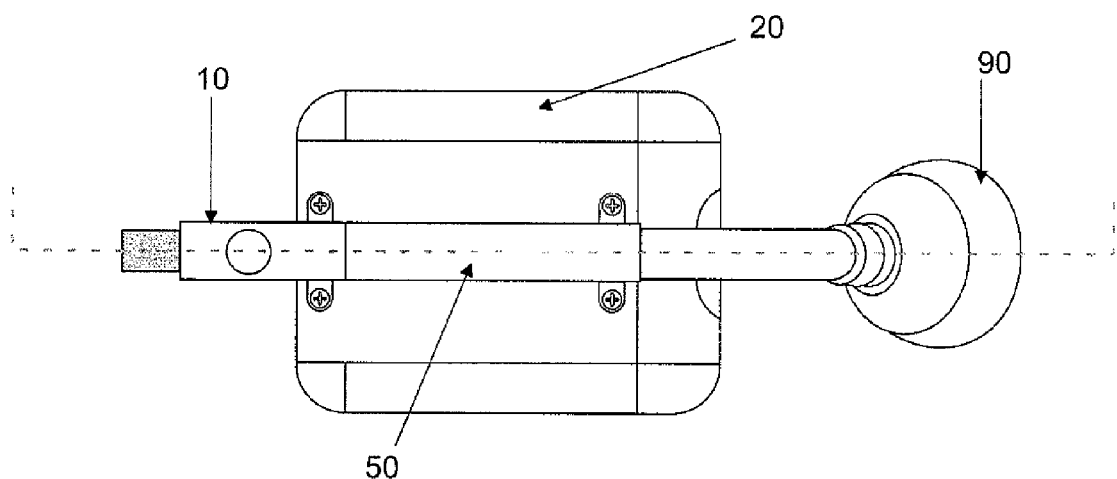
FIG. 3 is an upper view of the shower of the present invention.
Figure 4:
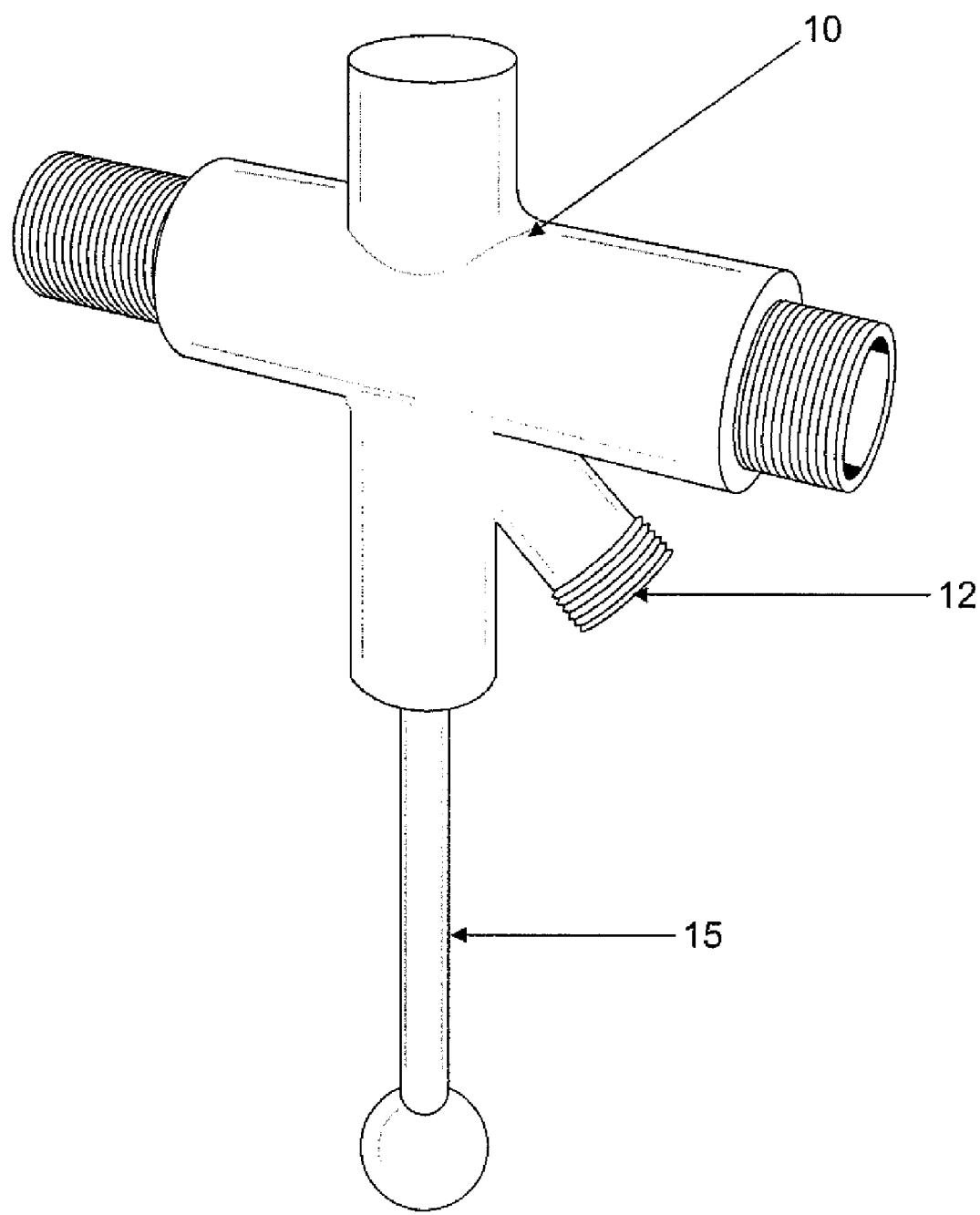
FIG. 4 is a perspective view of the deviation device of the system.
Figure 5:
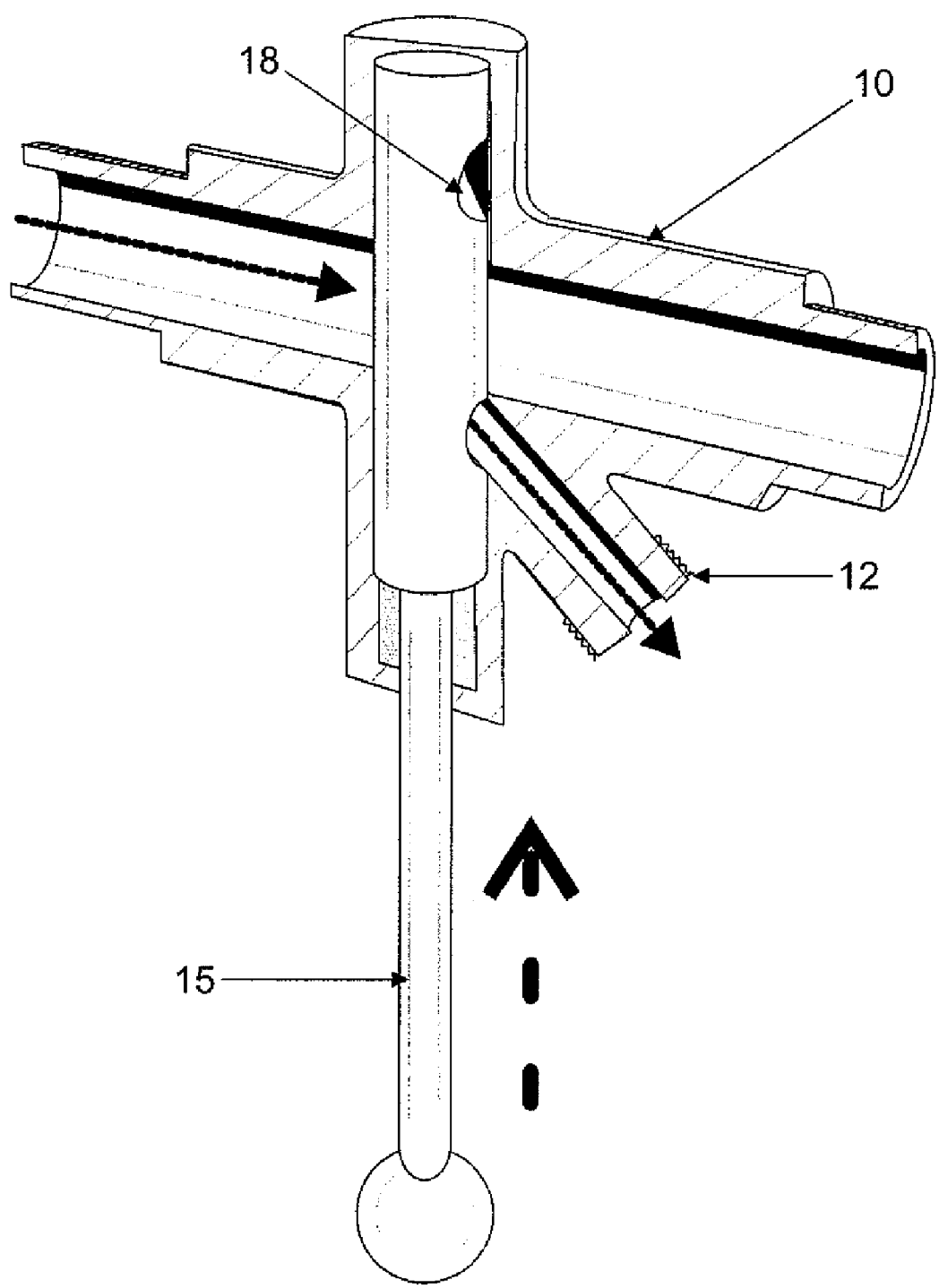
FIG. 5 is a cross-sectional view of said deviation device shown at the position wherein the water flow is directed to the storage tank.
Figure 6:
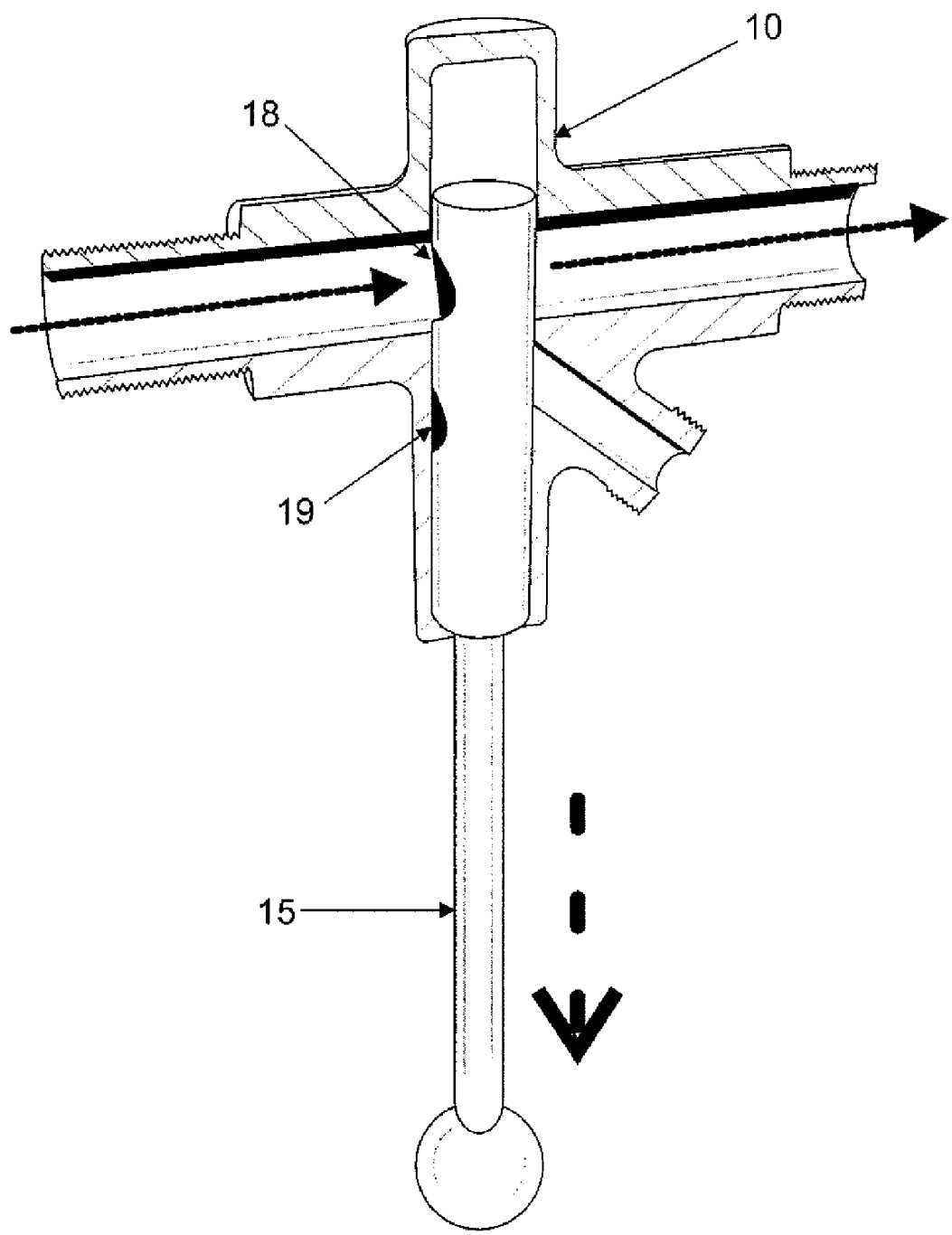
FIG. 6 is a cross-sectional view of said deviation device shown at the position wherein the water flow is directed to the shower outlet.
Figure 7:
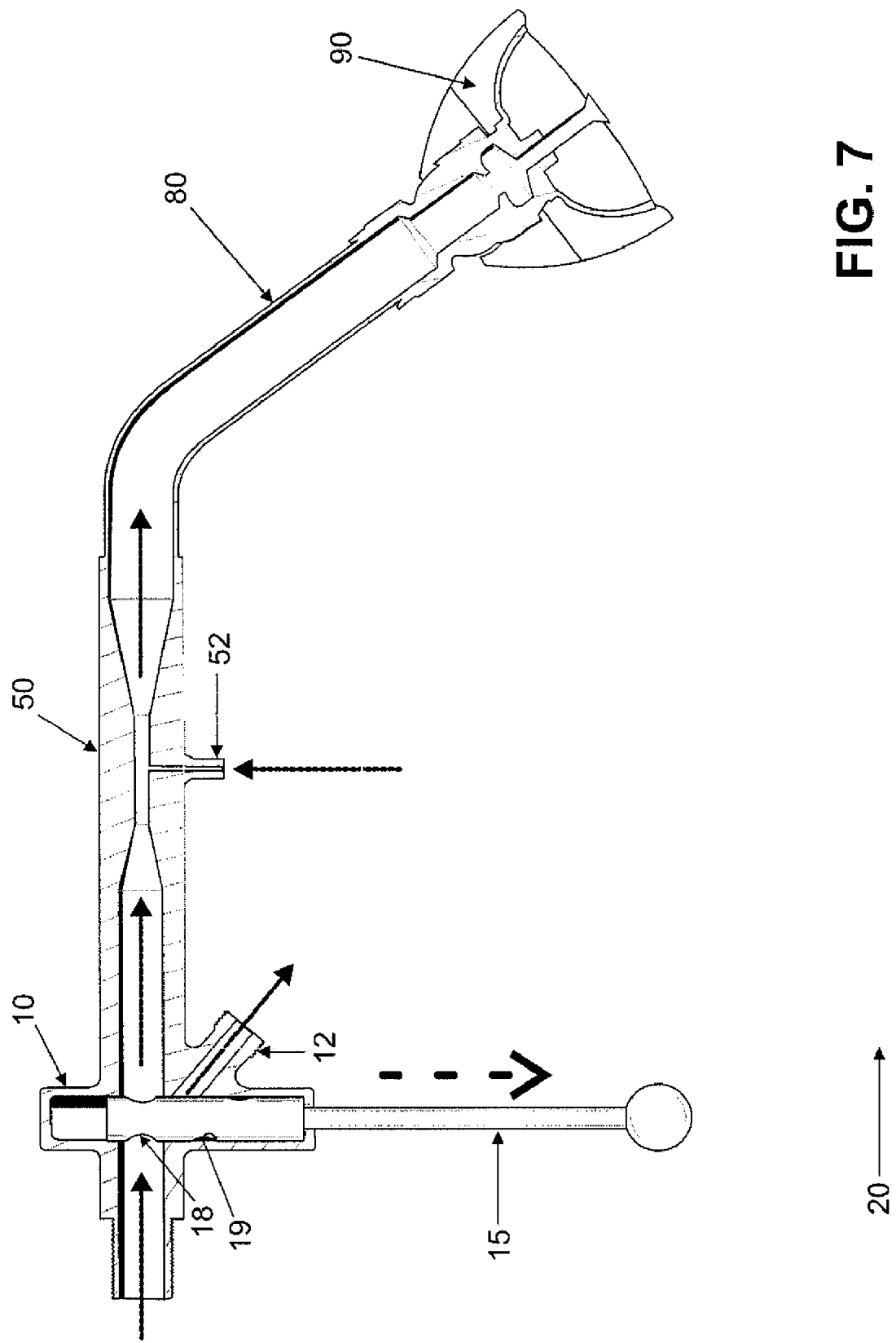
FIG. 7 is a cross-sectional view showing the elements (deviation device, actuating lever, venturi tube and shower element) being placed along the trajectory of water flowing towards the shower outlet.
Figure 8:
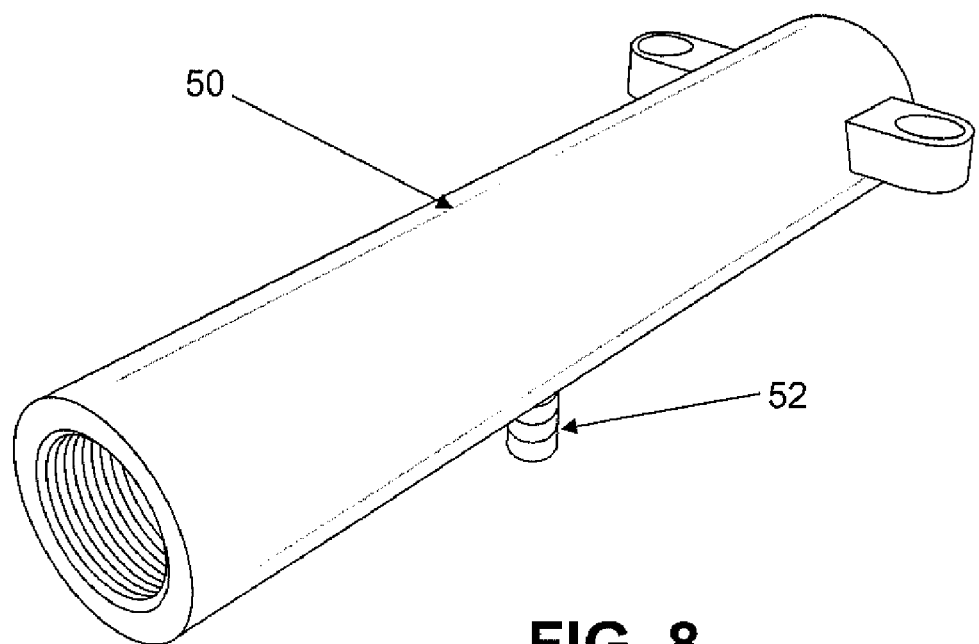
FIG. 8 is a perspective view of the venturi tube of the water saving system.

With reference to the accompanying drawings of the invention, the shower (100) with a system for saving water is characterized by comprising a set of elements coupled to the pipe that discharges the water in a conventional shower. The water saving system includes a device (10) for deviating the water flow, which is coupled to the connection (8) of the conventional water pipe in a site adjacent or near the wall (5), said device (10) being designed to include a distribution chamber (25) by which the water is directed in two predetermined trajectories of flow, one at a time. To this end, said device (10) includes a lever (15) inserted in a conduit of said device to move rectilinearly throughout said conduit from a first position in which the passage of the water towards the shower remains blocked (FIG. 5), causing the water discharges in said tank through the angled orifice (19) of the lever, to a second position in which the passage of the water throughout the pipe (80) is unblocked (FIG. 6) to allow the water to flow towards the shower element (90), when the orifice (18) of the lever matches with the conduit of said pipe (80). Lever (15) is an elongated tubular member including at the forward section thereof (the end portion being introduced in the deviation device) said through holes or orifices (18, 19) which act as passage elements to direct the water flow as it is indicated before, according to the lever's position.

The system (100) further includes a tank (20) for water storage, which is located underneath the level of the pipe (80) of water and fastened to this latter by any suitable means. This tank is adapted to collect the cold water flowing towards said tank through a conduit (12) in said derivation device (10) and a hose (17) connected to said conduit when said lever (15) is in the first position; said hose being connected to an inlet (22) disposed at the superior surface of said tank. The tank (20) is of any appropriate capacity and further includes means of detecting the level of water discharged in said tank, said detecting means comprising a floater (30) and an alarm switch (32) that is activated by said floater when this latter has reached the predetermined maximum level of water calculated to be contained in said tank. As result of the activation of said switch (32) an audible alarm (40) will be activated to advise the user by means of intermittent sounds that flowing water is comfort to bathe.

Figure 9:
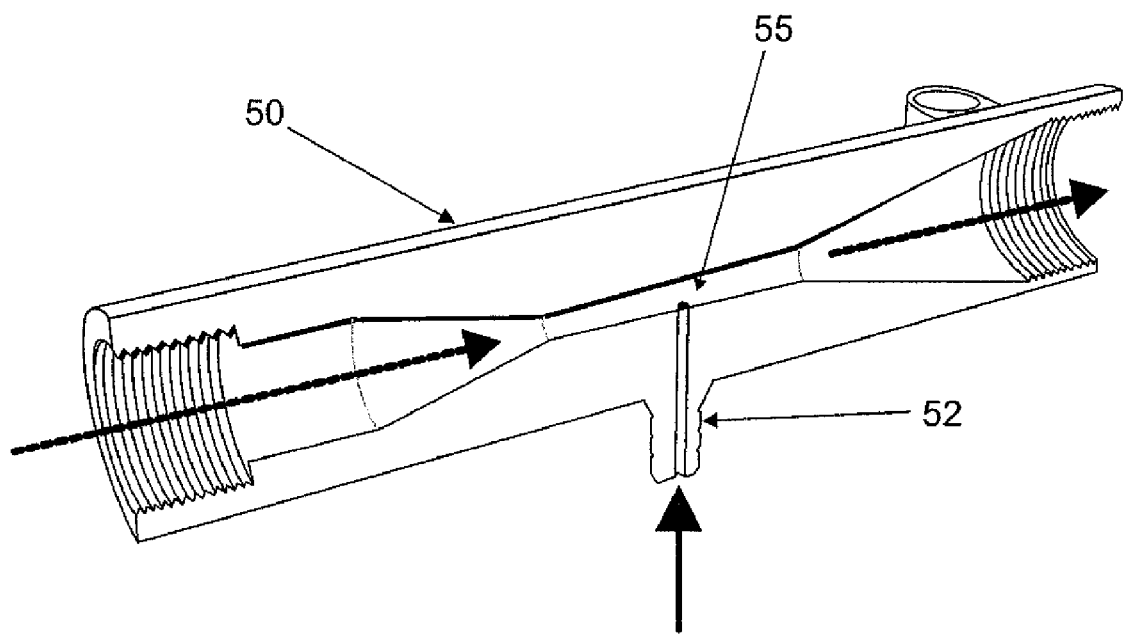
FIG. 9 is a perspective cross-sectional view of the venturi tube.

A venturi-type device (50) is disposed in the trajectory of water flow, in a position between the deviation device (10) and the shower (90), said device being adapted to influence on the pressure and speed of said water flow passing through said venturi device. In addition, the venturi device (50) has a water return conduit (52) connected in fluid communication with the interior of said tank (20) by means of a hose (24) so that when the water flows through the venturi device (50), when said lever is in the aforementioned second position, a vacuum effect occurs in the vacuum chamber (55) of said device (50), which causes the water collected in said tank is suctioned to re-enter (FIG. 9) into the pipe (80) to mix with the water flowing from the conventional water heater (not shown) towards the shower element (90).

MODE OF OPERATION

Everything begins with the discharge of water of the shower as usual, that is, by manipulation of the handles (not shown) controlling the discharge of hot and cold water, causing the water (that in normal conditions is at room temperature) flows in the pipes and reaches the new shower to enter firstly into the distribution chamber of said deviation device (10) operating at a first position to direct the flow of water to the storage tank (20), said water passing through said flexible connection (17). When the water reaches a predetermined filling level in said tank (20), which will depend on the capacity of this latter, the floating element (30) automatically actuates the switch (32) of said filling alarm (40), which is fed by a battery (35) of 9 volts; then, said alarm (40) will emit an intermittent sound to indicate the user that it is time to bathe and change of position the lever (15) of the deviator device (10) so that the water flow is directed normally, that is, through the venturi tube (50). When the flow of water passes through said device (50), it is compressed and decompressed quickly causing a vacuum effect that suctions the water stored in said tank (20) through the hose (24) to re-enter said water into the tube (50). By means of this process, the mixture of the hot water coming from the water heater with the cold water contained in said tank is produced in the vacuum chamber of said venturi tube (50); said water already mixed and at a comfortable temperature passes through the shower arm (80) towards the shower element (90) to be discharged.

The field of application of this model of shower is as ample as the construction industry and the amount of people worried about the deterioration of the natural resources in all the planet, since the existing showers can be replaced by the new one proposed in this document.

According to a basic preliminary study, it has been determined that depending on the tank included in the water saving system previously described, between 5 and 12 liters of water can be saved per individual shower bath. This calculation renders certain accumulated data, for example, in a family consisting of 3 members who bathe daily in a shower incorporating the new water saving system equipped with a tank with 5 lts. the following saving of water would be achieved:

| | | |
|---|---|---|
| Daily | 15 | lts |
| Weekly | 105 | lts |
| Monthly | 420 | lts |
| Annual | 5.040 | lts |

If only 100.000 homes like the one referred to in the preceding example, which are equivalent to a small city, were equipped with the new water saving system it is expected to save 504.000.000 liters or 504.000 cubic meters of water in a year. Let us imagine what it would be possible to be saved in big cities like the Federal District (Mexico City).

Elements that have talked about in the preceding description:
- 5.—Wall.
- 8.—Conventional connection for exit to shower.
- 10.—Deviator of flow to tank/shower.
- 12.—Derivation conduit.
- 15.—Lever of deviator.
- 17.—Hose or flexible connection.
- 18,19.—Orifices in lever.
- 20.—Tank.
- 22.—Flexible connection between the deviator and tank.
- 24.—Hose of water return.
- 25.—Distribution chamber.
- 30.—Floater.
- 32.—Alarm switch.
- 35.—Battery.
- 40.—Alarm.
- 50.—Venturi tube.
- 52.—Conduit of water return.
- 55.—Vacuum chamber.
- 80.—Shower arm.
- 90.—Conventional shower.
- 100.—General System.

Although this invention has been described in the context of its preferred modality, it will be evident for a skilled person in the art that the scope of the present invention extends beyond the embodiment specifically described to other alternative embodiments and/or uses of the invention being obvious and deriving from the invention. In addition, although the invention has been described in detail, some other modifications or variations falling within the scope of the present invention will be clearly obvious for any skilled persons in the art, specially based on the preceding description. Therefore, it is anticipated that several combinations of the specific characteristics and aspects of the described embodiment can be made, which would fall unquestionably within the scope of the invention, Taking into account the foregoing, it will be understood that several characteristics and aspects of the described embodiment can be combined with others or replaced by others to conform alternating ways of accomplishment of the new shower with a water saving system. Thus, it is intended that the scope of the present invention is not limited by the particular embodiment having been described hereinbefore, but rather said scope should be defined by a reasonable reading of the following claims.

The invention claimed is:

1. A shower having a water saving system, comprising:
a tank for water storage, which is located at the flow trajectory of the water coming from a water heater;
a deviation device for deviating the water flowing through a water pipe, said deviation device having a lever that works between two positions, a first position allowing the water to flow along the normal trajectory of a conventional pipe, by following a direction towards the shower outlet, and second position in which the water flow is directed transitorily towards the storage tank; the deviation device further includes a chamber of distribution of the water flow passing through said device, which chamber interacts with said position lever;
means for detecting the water level inside the storage tank, said means for detecting comprises a floating element and a warning device being activated by said floating element when the water contained in said tank has reached a predetermined level of height; and
a venturi-type device being connected in fluid communication with said pipe that canalizes the water towards the shower, between the deviation device and the shower;
said venturi device has means for connection with a hose or tube placed within the tank and wherein said hose or tube allow the water contained in the tank re-enters into the trajectory of flow of water of said device to be mixed in vacuum chamber in the venturi device with the water coming from the conventional pipe to a higher temperature, once the lever of the deviation device has moved to the position in which it allows that the water to follow the trajectory towards the shower outlet without entering into the storage tank.

2. The shower of claim 1, in which said venturi device is located immediately after of said deviation device in direction towards the shower outlet.

3. The shower of claim 1, in which said warning device is of the audible and/or luminous type.

4. The shower of the claim 1, in which said storage tank is covered by a lip and said warning device is attached thereto.

5. The shower of claim 1, wherein said storage tank may be fastened to the water pipe of the shower.

6. The shower of the claim 1, in which the open end of said hose or tube is near the bottom of said storage tank.

7. The shower of the claim 1, in which said floating element is fastened to the inferior surface of the lip covering said tank.

8. The shower of the claim 1, further including a hose connected by one end to said deviation device and by the other end to said tank lip to discharge the water directed towards said tank by said deviation device.

9. The shower of claim 1, in which said lever has a pair of through holes via which, depending on the lever position, the flow of water is directed towards the storage tank or the shower outlet.

10. The shower of claim 1, in which said deviation device includes a derivation conduit to direct the water flow towards said storage tank.

11. The shower of claim 1, vacuum chamber promoting the water contained in said tank to re-enter into said venturi device to be mixed with the water coming from the conventional pipe.

12. The shower of claim 1, further including energizing means for activating said alarm.

* * * * *

UNITED STATES PATENT AND TRADEMARK OFFICE
CERTIFICATE OF CORRECTION

PATENT NO. : 7,490,373 B1 Page 1 of 1
APPLICATION NO. : 12/047098
DATED : February 17, 2009
INVENTOR(S) : Zavala-Avelar and Juan Pablo It is certified that error appears in the above-identified patent and that said Letters Patent is hereby corrected as shown below:

Title page, add

Item --(30)    Foreign Application Priority Data

December 19, 2007   (MX) ............................................MX/2007/016598--

Column 1, Line 8, "Spanish Patent" should be changed to --Mexican Patent--

Column 5, Line 56, "the invention," should be changed to --the invention.--

Column 6, Line 27, "vacuum chamber" should be changed to --a vacuum chamber--

Signed and Sealed this

Thirtieth Day of June, 2009

JOHN DOLL
*Acting Director of the United States Patent and Trademark Office*